June 13, 1950 J. M. BARSTOW 2,511,617

POWER LINE CARRIER FREQUENCY TELEPHONE SYSTEM

Filed Oct. 11, 1946 2 Sheets-Sheet 1

INVENTOR
J. M. BARSTOW
BY
R. O. Covell
ATTORNEY

June 13, 1950 J. M. BARSTOW 2,511,617

POWER LINE CARRIER FREQUENCY TELEPHONE SYSTEM

Filed Oct. 11, 1946 2 Sheets-Sheet 2

INVENTOR
J.M.BARSTOW
BY
R.O. Covell
ATTORNEY

Patented June 13, 1950 2,511,617

UNITED STATES PATENT OFFICE 2,511,617

POWER LINE CARRIER FREQUENCY TELEPHONE SYSTEM

John M. Barstow, Mountain Lakes, N. J., assignor to Bell Telephone Laboratories, Incorporated, New York, N. Y., a corporation of New York Application October 11, 1946, Serial No. 702,735

6 Claims. (Cl. 179—2.5)

Figure 1:
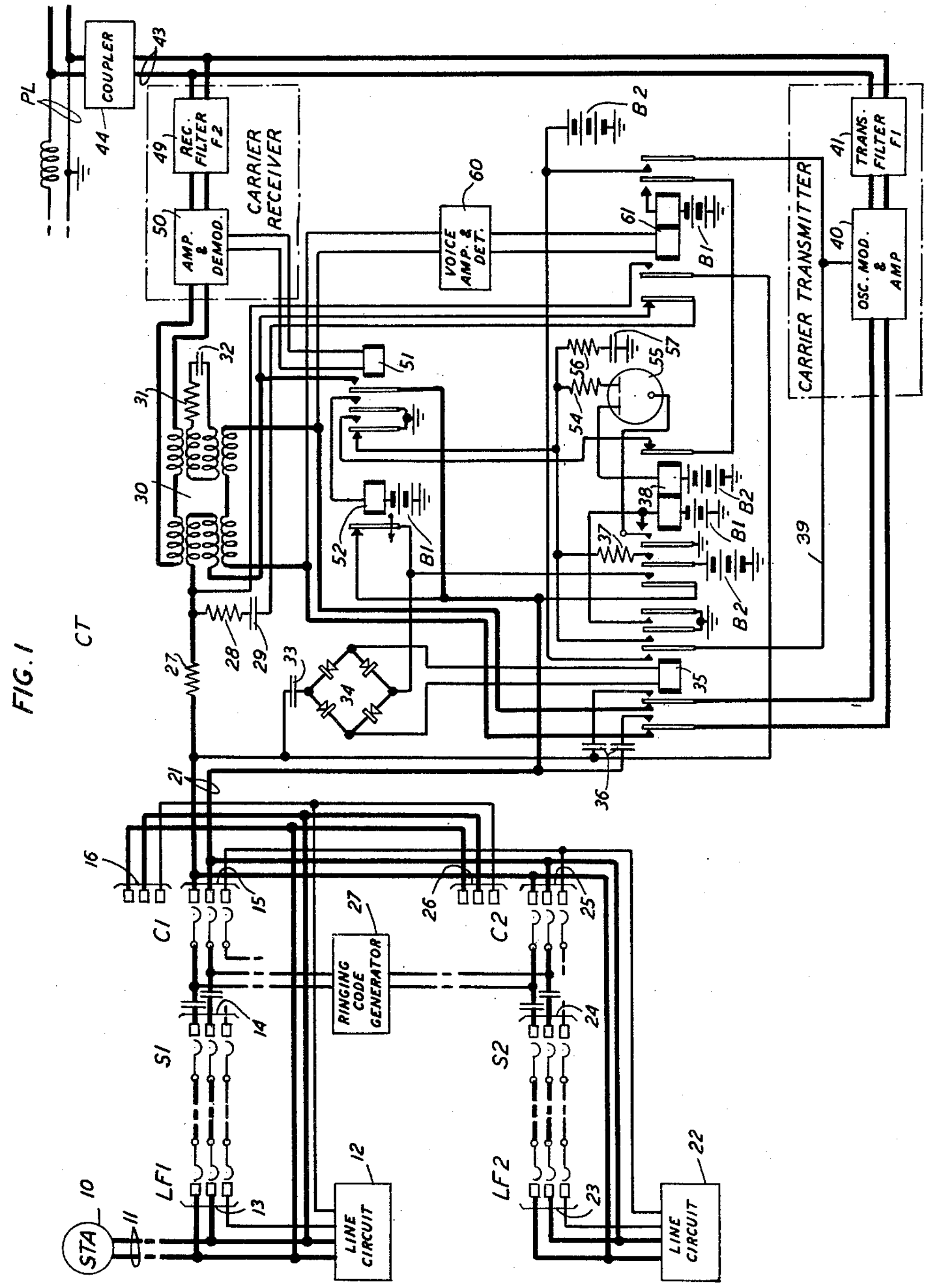

This invention relates to communication systems and particularly to telephone systems including subscriber stations arranged for carrier current operation over a power transmission line.

Objects of the invention are the provision of carrier telephone service over power transmission lines, the provision of means for automatically guarding the telephone line which connects the power line to a telephone central office on calls between telephone stations connected to the power line, the elimination of manual control means heretofore provided at such stations for use only on such calls, and in general the simplification and improvement of power line carrier telephone systems.

This invention is a telephone system including subscriber stations arranged for carrier current operation over a power transmission line, carrier current of one frequency being used for transmitting over the power line voice and signal currents to any one of these stations and carrier current of another frequency being used for transmitting over the power line voice and signal currents from any one of these stations. On reverting calls the carrier frequencies for transmitting voice and signal currents to and from calling station are automatically interchanged.

A feature of the invention is a carrier terminal station or equipment unit connecting a telephone line from the telephone central office to a power transmission line, the carrier terminal equipment comprising a voice amplifier and relay responsive to voice frequency currents incoming over the telephone line from the central office, the operation of this relay being effective to energize the carrier transmitter and thus effect the transmission of carrier current from the carrier terminal over the power line. Because on a call between stations connected to the power line, no voice frequency current is transmitted from the telephone central office after the called station answers the call, the voice frequency relay in the terminal equipment remains normal and no carrier current is transmitted from the carrier terminal equipment while conversation takes place between the calling and called stations.

Understanding of the invention will be facilitated by considering a system in which the invention and its features are embodied, such a system being represented schematically in the drawings. The invention is, however, not limited in its application to the particular system shown but is generally applicable to telephone systems.

The drawing, which consists of two figures, represents an automatic telephone exchange serving subscriber stations some of which are arranged for carrier current operation over a power transmission line.

Fig. 1 shows an automatic telephone exchange comprising a subscriber station 10, subscriber lines 11 and 21 and line circuits 12 and 22, line finder switches LF1 and LF2, selector switches S1 and S2, connector switches C1 and C2, carrier terminal equipment CT individual to the line 21, and a power transmission line PL to which the carrier terminal equipment CT is coupled by coupling means 44.

Figure 2:
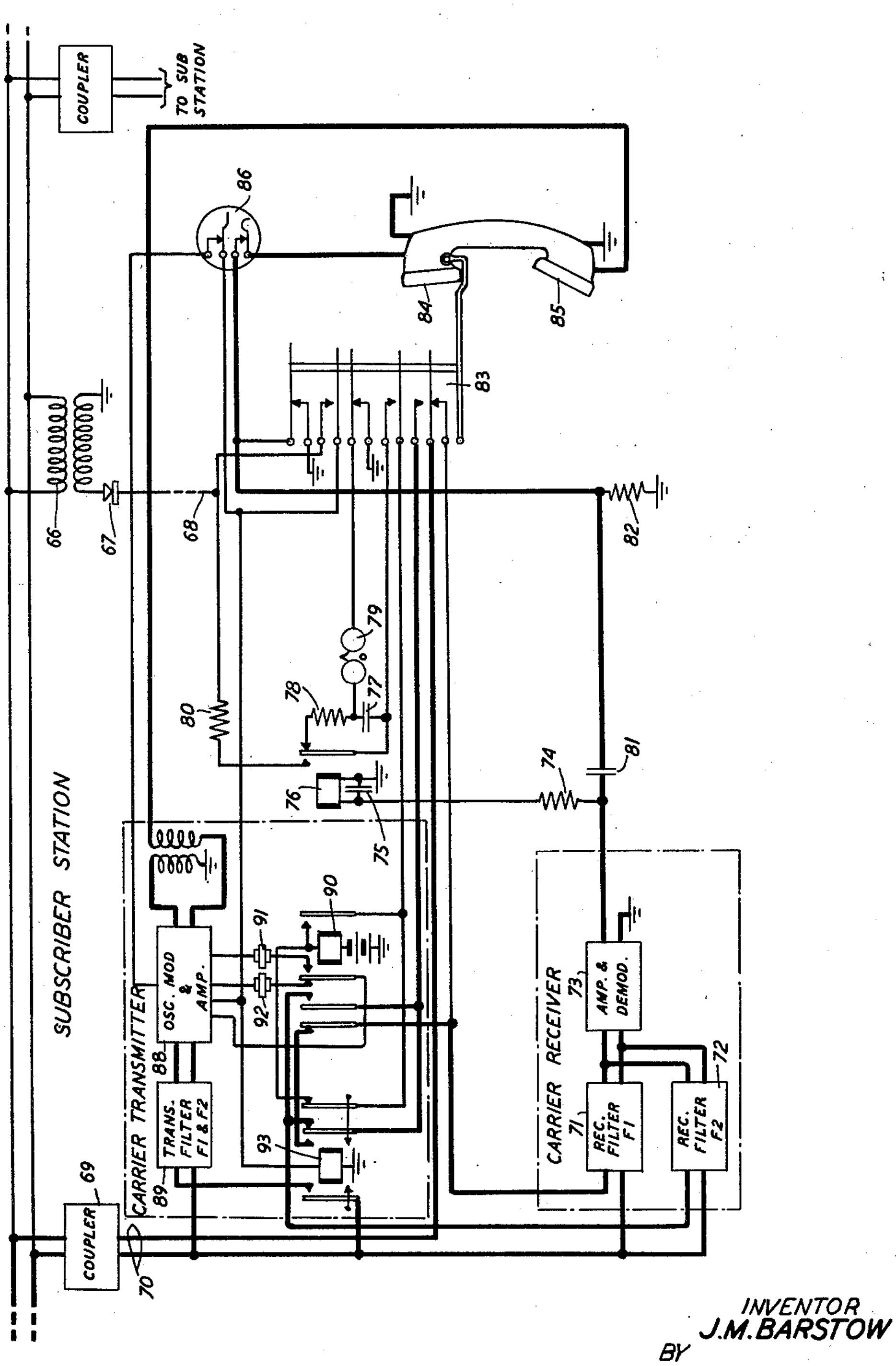

Fig. 2 shows one of a plurality of subscriber stations connected to, and arranged for carrier current operation over, power line PL.

The subscriber station 10 is of the usual type provided for use on lines terminating in an automatic central office and includes a dial or other impulse sender (not shown) for use in selectively controlling the switches through which desired connections are established. The line finder, selector and connector switches are of the two-motion step-by-step type, each of the line finder and selector switches being represented in the drawing by a set of brushes and a single set of terminals and each of the connector switches being represented by a set of brushes and two sets of terminals. The relays and other apparatus associated with the line finder, selector and connector switches are represented by broken lines. Reference may be had to "Automatic Telephony," by Smith and Campbell, 2nd edition, pages 53 to 65, inclusive for a detailed description of the structure of such switches and their operation when used as selectors and connectors. Reference may be had to the patent to R. L. Stokely, No. 1,799,654, granted April 7, 1931, for a detailed disclosure of a line circuit and a line finder of the step-by-step type. The ringing code generator 27 comprises a source of ringing current and means for interrupting the ringing supply conductors as required to produce a plurality of different ringing codes for signaling subscriber stations. Reference may be had to the patent to Duguid, No. 2,225,907, granted December 24, 1940, for disclosure of such a ringing code generator and to the patent to Koechling, No. 2,289,503, granted July 14, 1942, for a detailed disclosure of a connector switch arranged for ten-party code ringing.

The carrier terminal equipment CT, power line PL, and the carrier telephone stations of Fig. 2 constitute a power line carrier telephone system similar generally to the system disclosed in the copending application of R. C. Edson and J. W. Emling, Serial No. 653,254, filed March 9, 1946, now Patent No. 2,481,915, granted September 13, 1949, to which application reference may be had for discussion of the carrier frequencies suitable for use in such systems and disclosure of the coupling means between the power line and the carrier receivers and transmitters and details of the carrier terminal equipment CT and carrier telephone stations. The power line PL is one phase of a power transmission line which serves a plurality of power and light customers, some of which are equipped for carrier telephone service as shown in Fig. 2.

The carrier terminal equipment CT comprises a hybrid coil or group of transformer windings 30 arranged to transmit signal and voice currents to and from line 21. The resistor 31 and condenser 32 constitute a network connected to the middle right pair of windings to balance the line 21. The upper pair of windings receive voice frequency currents from a carrier receiver comprising the amplifier-demodulator 50; and the lowest pair of windings transmit voice frequency currents from line 21 to the input circuit of a carrier transmitter comprising oscillator-modulator-amplifier 40. The power line PL is connected through coupling means 44 and conductors 43 to the carrier receiver comprising receiving band filter 49 and amplifier-demodulator 50, and to the carrier transmitter comprising transmitting band filter 41 and oscillator-modulator-amplifier 40. The amplifier-demodulator 50 and oscillator-modulator-amplifier 40 may be of any known suitable type. The oscillator-modulator-amplifier 40 is tuned to generate and transmit through filter 41, carrier current of a particular frequency, designated F1, modulated by either signaling or voice currents incoming to hybrid coil 30 from line 21. The amplifier-demodulator 50 receives, through filter 49 from the power line PL, carrier current of another particular frequency, designated F2, modulated by voice and signal currents from any one of the carrier telephone stations connected to the power line PL. The transmitting and receiving filter 41 and 49 transmit the voice frequency side bands in addition to the carrier frequency. The carrier terminal equipment CT further comprises relay 35 controlled by ringing current incoming over line 21 to energize the oscillator-modulator-amplifier 40 and thereby transmit impulses of carrier current over the power line corresponding to the ringing code received by relay 35 from line 21. The carrier terminal equipment CT further comprises relays 51 and 52 controlled by carrier current of frequency F2 received over power line PL by amplifier-demodulator 50, an amplifier and detector 60 responsive to voice frequency current incoming over line 21, a relay 61 controlling the energization of oscillator-modulator-amplifier 40, and an auxiliary ringing relay 38 which controls the locking winding of relay 61. A resistor 27, connected in series with the middle left windings of hybrid coil 30 and a resistor 28 and condenser 29, normally connected in parallel with these windings constitute a network which in combination with line 21 have an impedance equal to that of the balancing network 31, 32; whereby a good balance is obtained on reverting calls so that relay 61 will not operate responsive to voice modulated carrier current of frequency F2 incoming over the power line from the called station as hereinafter described. The functions of each of the relays is hereinafter described in detail.

Each of the carrier telephone stations is similar to the one shown in Fig. 2 and is connected through individual coupling means 69 to the power line PL. Each station comprises a carrier receiver, a carrier transmitter, a telephone receiver 84 and transmitter 85 combined in a handset which normally rests on the receiver hook 83, a dial 86 for controlling automatic switches in the central office to establish desired connections, a ringer 79 and a ringing relay 76 connected to demodulator 73 for actuating the ringer 79 responsive to ringing modulated carrier current of frequency F1. The carrier receiver comprises a receiving band filter 71 tuned to the carrier frequency F1, a receiving band filter 72 tuned to the carrier frequency F2, and amplifier-demodulator apparatus 73. The carrier transmitter comprises oscillator-modulator-amplifier apparatus 88, a transmitting band filter 89, a frequency control relay 90, oscillator crystals 91 and 92, and a relay 93 for connecting the output conductors of filter 89 to the power line. Each of the receiving and transmitting filters transmit the voice frequency side bands in addition to the carrier frequency.

The oscillator-modulator-amplifier apparatus, conventionally illustrated as a rectangle 88, includes an oscillator whose frequency is controlled by the one or the other of the crystals 91, 92 depending upon the operated or unoperated condition of relay 90, amplifying and modulating means whereby the carrier waves are modulated at times in accordance with voice waves applied through transformer 87. The oscillator may be any suitable and well-known crystal controlled oscillator such as found shown in Cady's book on Piezoelectricity, first edition, 1946, by McGraw-Hill Book Company, Incorporated, pages 495 and 499, Taylor Patent 1,639,817, dated August 23, 1927, or Nicholson Patent 2,212,845, dated August 27, 1940. The one or the other of the two crystals 91 or 92 is switched into circuit to establish the carrier frequency at one value or another at different times as herein described. Modulation may be accomplished in any suitable well-known manner by means of any one of many modulating circuits of which the following examples are given, Van der Bijl Patent 1,350,752, August 24, 1920, and Heising Patents 1,343,562, June 15, 1920, and 1,560,054, November 11, 1925. Lack Patent 2,218,200, October 10, 1940, discloses a suitable combined oscillator and modulator which could readily be arranged for shift from one crystal to another by relay 90. Devices of this kind are considered to be so well known in the art that they need no further description.

The power supply for the oscillator-modulator-amplifier and demodulator apparatus at each carrier subscriber station includes a rectifier 67 and a transformer 66 connected to the power line PL either directly or through an intermediate transformer. Other transformer windings may supply the energy for heating the filaments of vacuum tubes and supply whatever other operating potentials are required.

*Call from station 10 to a carrier telephone station*

Assume that a call is initiated at station 10, that the line 11 is connected by a line finder LF1 to a selector S1, that the selector S1 is selectively controlled by dial impulses from station 10 to select a group of trunks and an idle trunk therein associated with a connector C1, and that the connector C1 is selectively controlled by dial impulses from station 10 to select the line 21. Assume further that the line 21 is idle when selected and tested by connector C1, that a ringing code is selected responsive to dial impulses from station 10, and that the selected ringing code is transmitted through the brushes of connector C1 over the conductors of line 21, through condenser 33, rectifier 34, and a back contact of relay 52 to the winding of relay 35. Relay 35 is thereby operatively energized during each ringing interval of the ringing code transmitted over line 21. The operation of relay 35 closes a circuit for operating relay 38; connects the positive pole of battery B2 to conductor 39 to energize oscillator-modulator-amplifier 40; and connects line 21 through condensers 36 to the input conductors of modulator-amplifier 40, whereby ringing modulated carrier current of frequency F1 is transmitted through filter 41, conductors 43, and coupling means 44, over the power line PL, to each of the carrier telephone stations connected to the power line. Relay 38 locks independent of relay 35, opens the locking path of relay 61, connects ground to the cathode of gas-filled tube 55 and connects the positive pole of battery B2 through resistors 37 and 56 to the control anode of tube 55. The tube 55 is not energized at this time since the control gap is short-circuited by ground at a front contact of relay 35 and also at a back contact of relay 51. At each of the telephone stations connected to line PL, the incoming ringing modulated carrier current of frequency F1 is transmitted through a coupler 69, conductors 70, and a normally closed contact of the springs controlled by receiver hook 83, through filter 71 to the input circuit of amplifier-demodulator 73. The output circuit of amplifier-demodulator 73 includes resistor 74 and the winding of relay 76 and relay 76 is operated responsive to carrier current incoming over the power line. A condenser 75, connected in parallel with the winding of relay 76, renders this relay somewhat slow in operating so as to tend to prevent its operation responsive to interference currents such as static. The output conductor of demodulator 73 is further connected through condenser 81 and the off-normal contact of dial 86 to telephone receiver 84, in parallel with resistor 82. While the telephone handset is in normal position on hook 83, the receiver 84 and resistor 82 are short-circuited at a back contact of the receiver-hook contact springs. The operation of relay 76 closes a circuit from the left lower winding of transformer 66 through rectifier 67, conductor 68, resistor 80, front contact of relay 76, condenser 77, and through the windings of ringer 79 to ground at a back contact of the springs of hook 83. The windings of ringer 79 are thereby energized while condenser 77 is charging. Since the incoming carrier current of frequency F1 is modulated by the ringing current over line 21, relay 76 is alternately operated and released at the ringing current frequency (for instance 16 cycles per second) during each ringing interval of the ringing code. Each time relay 76 releases, condenser 77 discharges through resistor 78; and each time relay 76 reoperates, condenser 77 is charged through ringer 79. Thus the ringer at each carrier telephone station is actuated in accordance with the ringing code of the particular station which is being called.

When the handset is removed at the called station, the circuit through ringer 79 is opened, the short circuit across the receiver 84 is opened, and the positive potential supply conductor 68 is connected to the winding of relay 93 and to the oscillator-modulator-amplifier 88. Relay 93 is somewhat slow in operating to allow time for relay 90 to operate if relay 76 is operated at the time the handset is removed, as is the case at the calling station on a reverting call as hereinafter described. However, on the call being described, relay 76 is not operated at the called station when the handset is removed because at this time there is no carrier current being transmitted over the power line; and therefore relays 76 and 80 are not operated. If the receiver were lifted during ringing while relay 76 was operated, relay 90 would operate to connect filter 72 into the receiving circuit, but there being no carrier power of frequency F2 on the power line, and relay 93 being slow to operate, relays 76 and 90 would immediately release. Relay 93 connects the output conductors of filter 89 across conductors 70, and connects the input conductors of filter 71, through a receiver hook contact and a back contact of relay 90, across conductors 70. Relay 76 is thereupon operated responsive to carrier current of frequency F1 incoming over the power line PL from the carrier terminal equipment CT; but relay 90 cannot now operate because the operation of relay 93 opens the connection between the contact spring of relay 76 and the winding of relay 90. With relay 90 normal, the oscillator crystal 92 is connected, through the inner left back contact of relay 90, in the oscillator circuit of oscillator-modulator-amplifier apparatus 88; and carrier current of frequency F2 is transmitted from the amplifier of apparatus 88, through filter 89 and a front contact of relay 93, through conductors 70 and coupling means 69, over power line PL to each of the other carrier stations and to the carrier terminal equipment CT. At the other carrier telephone stations, the carrier current of frequency F2 does not reach the demodulator 73 because the input circuit of filter 72 is open as long as the handset is in normal position on hook 83; but, at the carrier terminal equipment CT, the carrier current of frequency F2 passes through coupler 44, conductors 43, and receiving band filter 49 to the input circuit of amplifier-demodulator 50, causing the operation of relay 51. The operation of relay 51 closes a circuit for operating slow-to-release relay 52 and closes a direct current path through the middle left pair of windings of hybrid coil 30 across the conductors of line 21, thereby to operate the ringing trip relay (not shown) of the connector C1 and thus terminate the transmission of ringing current over line 21 and close the talking circuit through connector C1 between lines 11 and 21. The operation of relay 52 opens the circuit connection between the winding of relay 35 and line 21. With relay 35 released and relay 51 operated, the aforementioned short circut across the control gap of tube 55 is opened and condenser 57 starts to charge in series with resistors 56 and 37. After a predetermined interval of time, for instance, .6 second during which condenser 57 is charging, the voltage across the control gap of tube 55 will reach the discharge value whereupon the right winding of relay 38 is energized in series with the main gap of tube 55. Since the windings of relay 38 are differentially energized, relay 38 releases and the tube 55 is extinguished. The release of relay 38 prepares the locking circuit of relay 61; so that after relay 61 is operated, it will maintain the energization of amplifier-modulator 40 during conversation between the calling station 10 and the called station connected to the power line. The delay in the breakdown of the tube 55 and release of relay 38 allows relay 61 to release if operated due to surges resulting from tripping of the ringing current. Voice currents incoming over line 21 from station 10 are transmitted through the lowest pair of windings of hybrid coil 30 to the input conductors of voice amplifier and detector 60 to effect the operation of relay 61. Relay 61 locks under the control of relays 38 and 51, connects battery B2 to oscillator-modulator-amplifier 40 and thereby effects the transmission of carrier current of frequency F1 over the power line PL, opens the bridge through resistor 28 and condenser 29 and short-circuits resistor 27. The voice currents from line 21 modulate the carrier current of frequency F1 transmitted from oscillator-modulator-amplifier 40, through filter 41 over the power line PL to each of the carrier telephone stations. At the called carrier telephone station, the carrier current of frequency F1 incoming through filter 71 to amplifier-demodulator 73 effects the operation of relay 76 and the demodulated voice currents are transmitted through receiver 84. At each of the other carrier telephone stations, relay 76 is operated responsive to the carrier current of frequency F1 incoming to the amplifier-demodulator 73, but the receiver 84 is short-circuited; and, since relay 76 is continuously energized, no operation of the ringer 79 results. At the called station, voice currents from the transmitter 85 are transmitted through coil 87 to the input circuit of modulator 88, therein to modulate the carrier current of frequency F2 which is being transmitted over the power line PL, through coupler 44, conductors 43 and filter 49 to the amplifier-demodulator 50 of carrier terminal equipment CT, the voice currents being further transmitted through hybrid coil 30 over line 21 to the calling station 10. Thus talking proceeds between the calling station 10 and the called carrier telephone station.

When the handset is replaced on hook 83 at the called station, the receiver 84 is short-circuited, relay 93 is released, and the oscillator-modulator-amplifier 88 is deenergized, terminating the transmission of carrier current of frequency F2 over line PL and thereby causing the successive release of relays 51 and 52 of the carrier terminal equipment CT. The release of relay 51 opens the locking circuit of relay 61 and opens the bridge across line 21, thereby releasing the answering supervisory relay (not shown) of connector C1. If no voice current is being received over line 21, relay 61 releases, disconnecting battery B2 from conductor 39 so as to deenergize the oscillator-modulator-amplifier 40 and thus terminate the transmission of carrier current of frequency F1 over the power line. When the transmission of carrier current of frequency F1 over line PL ceases, relay 76 releases at each of the carrier subscriber stations. When the receiver is restored to normal at the calling station 10, the connector C1, selector S1 and line finder LF1 are restored to normal in usual and well-known manner.

*Call from carrier telephone station*

Assume next that the handset is removed from hook 83 at one of the carrier stations connected to power line PL to initiate a call. Relay 93 is thereby operated, relay 90 remains normal, and the oscillator-modulator-amplifier 88 is energized to transmit carrier current of frequency F2 over power line PL, causing the successive operation of relays 51 and 52 of the carrier terminal equipment CT, as above described. At each of the other carrier stations, the carrier current of frequency F2 transmitted over line PL from the calling station is ineffective to operate relay 76 because the input conductors 70 are normally connected across the input of filter 71 and are not normally connected across the input conductors of filter 72. The operation of relay 51 closes the bridge across line 21 to operate the line relay (not shown) of line circuit 22 and thus start the operation of an idle line finder LF2 to connect with line 21; and line 21 is thereby connected to the associated selector S2. The operation of relay 52 opens the circuit connection between relay 35 and line 21. Dial tone is transmitted from a selector S2 over line 21, through hybrid coil 30, to the input conductors of modulator 40 and to the input conductors of voice amplifier and detector 60, causing the operation of relay 61. Relay 61 locks and connects battery B2 to oscillator-modulator-amplifier 40 to effect the transmission of dial tone modulated carrier current of frequency F1 through filter 41 over power line PL to the carrier telephone stations. The carrier current of frequency F1 effects the operation of relay 76 at each of these stations; and, at the calling station, the dial tone is transmitted through receiver 84 to indicate that dialing of the number of the telephone station with which connection is desired, may be started. Each time a digit is dialed, the receiver is disconnected by actuation of the off-normal contacts of the dial from the amplifier-demodulator 73; and the impulse contacts of the dial alternately remove and apply energizing power to the oscillator-modulator-amplifier 88 to modulate the carrier current of frequency F2 being transmitted over line PL. At the carrier terminal equipment CT, relay 51 is alternately released and reoperated responsive to each dial impulse of the train of impulses transmitted over line PL corresponding to a dialed digit; and relay 51 thus repeats each train of dial impulses over line 21 to control the selector S2 and a connector C2 to establish connection with the called line and to select the ringing code which is to be transmitted over the called line to signal the called subscriber station. Relay 52 is slow-to-release and remains operated during the response of relay 51 to dial impulses. Relay 61 may or may not release during dialing.

Assume first that the called station is not another one of the carrier subscriber stations connected to power line PL. Ringing current of the selected code is transmitted through the brushes of connector C2 over the called line and, when the called subscriber answers the call, the ringing circuit is opened and the talking path is completed through connector C2 between the calling and called stations. If relay 61 released during dialing, it is reoperated when the called party answers. Release of the connection is under the control of the calling station. When the handset is restored to normal at the calling carrier subscriber station, relay 93 releases and oscillator-modulator-amplifier 88 is deenergized, terminating the transmission of carrier current of frequency F2 over power line PL and thus causing the successive release of relays 51 and 52 of carrier terminal equipment CT. The release of relay 51 opens the locking circuit of relay 61 and opens the bridge across line 21 to effect the return of the line finder LF2 and selector S2 to normal. The connector C2 is returned to normal when the connection has been released at both the calling and called stations.

Assume next that a call initiated at one of the carrier telephone stations, as above described, is a call to another one of the carrier stations connected to power line PL, such a call being known as a reverting call. In such a case, the connector C2 finds the called line 21 busy when it makes the usual busy test; and a busy tone is transmitted from connector C2 through selector S2 and line finder LF2, over line 21, through hybrid coil 30 to modulator-amplifier 40 and to voice amplifier and detector 60. Relay 61 operates, connecting battery B2 to amplifier-modulator 40; and busy tone modulated carrier current of frequency F1 is transmitted through filter 41, power line PL, filter 71, to amplifier-demodulator 73, and the busy tone is further transmitted through condenser 81 to the telephone receiver 84 at the calling station. The connector C2 is arranged to make a reverting call test to determine whether the called line is busy because the call is a reverting call. If the call is a reverting call the line finder LF2 and selector S2 are restored to normal when the calling subscriber replaces the receiver; but the connector C2 remains connected to line 21 to ring the called station. Reference may be had to the patent to H. Hovland, Patent No. 1,849,087, granted March 15, 1932, for disclosure of a connector arranged to make the aforementioned reverting call test. Upon hearing the busy tone transmitted from connector C2, the calling subscriber restores the handset to normal on the receiver hook 83. When the handset is hung on the hook 83, relay 93 releases and the oscillator-modulator-amplifier apparatus 88 is deenergized thereby terminating the transmission of carrier current of frequency F2, thereby causing the successive release of relays 51 and 52 of the carrier terminal equipment CT. The release of relay 51 opens the locking circuit of relay 61 and opens the loop across line 21 to effect the aforementioned release of the line finder LF2 and selector S2 and to effect the closing of the ringing circuit in connector C2, whereby ringing circuit is transmitted over line 21 to operate relay 35 according to the ringing code of the called station. The release of relay 52 closes the bridge consisting of condenser 33 and rectifier 34 across line 21, so that relay 35 is operated by the ringing current. Relay 35 connects line 21 through condensers 36 to the input conductors of modulator-amplifier 40 and connects battery B2 to oscillator-modulator-amplifier 40 so that ringing current modulated carrier current of frequency F1 is transmitted through filter 41 over line PL to each of the carrier subscriber stations to actuate the ringers according to the ringing code of the called station. The operation of relay 35 also causes the operation of relay 38 and relay 38 locks independent of relay 35.

When the handset is removed from hook 83 at the called station to answer the call, relay 93 is operated, oscillator-modulator-amplifier 88 is energized to transmit carrier current of frequency F2, and the input of filter 71 is connected across conductors 70. The carrier current of frequency F2 transmitted over line PL from the answering called station is without effect at the other carrier stations but causes the reoperation of relays 51 and 52 of the carrier terminal equipment CT. The operation of relay 51 closes the bridge across line 21 to trip the ringing and closes the talking path through connector C2. With relay 35 released and relay 51 operated, the short circuit across the control gap of tube 55 is opened; and .6 second later tube 55 is energized and the right winding of relay 38 is energized to cause the release of relay 38 as hereinbefore described. With relay 51 operated and relay 38 released, relay 61 would lock if operated; but on a reverting call no voice frequency current is received over line 21 after relay 38 releases so that relay 61 is not operated. With relay 61 normal, the oscillator-modulator-amplifier 40 remains deenergized after ringing is tripped in the connector C2 so that carrier current of frequency F1 is not transmitted over the power line PL from the carrier terminal equipment CT. Since relay 61 is normal, the network comprising resistors 27 and 28 and condenser 29 is connected between line 21 and hybrid coil 30 to balance network 31, 32 and thereby prevent operation of relay 61 by voice modulated carrier current transmitted over line PL.

When the operation of the ringer at the calling station ceases due to answer at the called station, the calling subscriber removes the handset from hook 83, thereby closing the connection from power line PL through conductors 70 and filter 72 to the input conductors of amplifier-demodulator 73. At this time carrier current of frequency F2 is being received over line PL from the called station, and the current in the output circuit of amplifier-demodulator 73 operates relay 76; and before the slow-to-operate relay 93 responds to the removal of the handset from hook 83, relay 76 closes a circuit for operating relay 90. Relay 90 locks independent of relay 93 and includes crystal 91 in place of crystal 92 in the oscillator circuit of oscillator-modulator 88 at the calling station to transmit carrier current of frequency F1 over line PL to the called station. When relay 93 operates, it connects the output of filter 89 across conductors 70. With relay 90 operated at the calling station, the connection between conductors 70 and the input of filter 72 is maintained until the handset is restored to normal. The calling and called stations are now in condition for conversation over the power line, voice currents from the transmitter 85 at the calling station being effective to modulate the carrier current of frequency F1 transmitted from the oscillator-modulator-amplifier 88 at the calling station, and voice currents from the transmitter 85 at the called station being effective to modulate the carrier current of frequency F2 transmitted from the oscillator-modulator-amplifier 88 at the called station.

The release operations on a reverting call vary according to the order in which the calling and called subscribers disconnect. If the calling subscriber hangs up first, relays 90 and 93 release and oscillator-modulator-amplifier 88 is deenergized at the calling station; but no change occurs at the carrier terminal equipment CT until the called subscriber also hangs up. When the called subscriber hangs up, relay 93 releases and the oscillator-modulator-amplifier 88 is deenergized thus terminating the transmission of carrier current of frequency F2 over power line PL and relays 51 and 52 of the carrier terminal equipment CT release in succession. The release of relay 51 opens the bridge across line 21 to effect release of the connector CT.

If the called subscriber hangs up first, relay 93 releases and oscillator-modulator-amplifier 88 is deenergized to terminate the transmission of carrier current of frequency F2 from the called station and thus cause the release of relays 51 and 52 of carrier terminal equipment CT and the release of relay 76 and 90 at the calling station. The release of relay 90 at the calling station connects crystal 92 into the oscillator circuit of oscillator-modulator 88 in place of crystal 91, whereby the carrier current transmitted therefrom is current of frequency F2 instead of frequency F1. Thus relay 51 is reoperated soon enough to prevent the release of connector C2 until the handset is hung up at the calling station; at which time, relay 93 releases and oscillator-modulator-amplifier 88 is deenergized at the calling station, relays 51 and 52 are released at the carrier terminal equipment CT, and connector C2 is restored to normal.

In case the called subscriber fails to answer, the calling subscriber answers and carrier current of frequency F2 is transmitted over line PL to operate relays 51 and 52 and release relay 58 of the carrier terminal equipment CT. Ringing is tripped due to the operation of relay 51; and, when the calling subscriber hangs up, relays 51 and 52 release at the carrier terminal, and relay 93 releases and oscillator-modulator-amplifier 88 is deenergized at the calling station.

What is claimed is:

1. In a telephone system, a telephone line, a power transmission line, a carrier terminal station interconnecting said lines, a plurality of telephone subscriber stations connected to said power line, each of said subscriber stations arranged to transmit carrier current of either one of two frequencies and receive carrier current of the other of said frequencies, said terminal station comprising a normally deenergized carrier current transmitter for transmitting carrier current of one of said frequencies modulated by voice and signal currents incoming over said telephone line and a carrier current receiver for receiving voice frequency modulated carrier current of the other of said frequencies over said power line, a relay at said carrier terminal station controlling the energization of the carrier current transmitter thereat, and means responsive to voice currents incoming over said telephone line to said carrier terminal station for energizing said relay.

2. In a telephone system, a telephone line, a power transmission line, a carrier terminal station interconnecting said lines, a plurality of telephone subscriber stations connected to said power line, each of said subscriber stations arranged to transmit carrier current of either one of two frequencies and receive carrier current of the other of said frequencies, said terminal station comprising a normally deenergized carrier current transmitter for transmitting carrier current of one of said frequencies modulated by voice and signal currents incoming over said telephone line and a carrier current receiver for receiving voice frequency modulated carrier current of the other of said frequencies over said power line, and control means at said carrier terminal station for energizing the carrier transmitter thereat, said control means comprising a voice frequency amplifier and detector connected to receive voice currents incoming over said telephone line to said terminal station and a relay operatively energized in response to voice current incoming to said amplifier and detector.

3. In a telephone system, a telephone line, a power transmission line, a carrier terminal station interconnecting said lines, and a plurality of telephone subscriber stations connected to said power line, each of said subscriber stations comprising carrier current transmitting and receiving means arranged to transmit carrier current of either one of two frequencies and to receive carrier current of the other of said frequencies, said carrier terminal station comprising a normally deenergized carrier current transmitter for transmitting carrier current of a first one of said frequencies over said power line, means for modulating the carrier current transmitted over the power line with voice currents incoming over said telephone line, a relay controlling the energization of said transmitter, and voice amplifier and detector means connected to said telephone line to operate said relay in response to voice currents incoming over said telephone line to said carrier terminal station.

4. In a telephone system, a telephone line, a power transmission line, a carrier terminal station interconnecting said lines, and a plurality of telephone subscriber stations connected to said power line, each of said subscriber stations comprising carrier current transmitting and receiving means arranged to transmit carrier current of either one of two frequencies and to receive carrier current of the other of said frequencies, said carrier terminal station comprising a normally deenergized carrier current transmitter for transmitting carrier current of a first one of said frequencies over said power line, a carrier current receiver for receiving over said power line carrier current of the other of said frequencies, a hybrid coil having windings connected in series with said telephone line and windings connected to the input conductors of said carrier transmitter, means including said windings of the hybrid coil for modulating with voice current received over said telephone line the carrier current of said first frequency transmitted over said power line, amplifier and detector means connected to said hybrid coil in parallel with said carrier transmitter, and means controlled by said amplifier and detector means for energizing said carrier transmitter in response to voice currents incoming over said telephone line.

5. In a telephone system, a telephone line, a power transmission line, a carrier terminal station interconnecting said lines, and a plurality of telephone subscriber stations connected to said power line, each of said subscriber stations comprising carrier current transmitting and receiving means arranged to transmit carrier current of either one of two frequencies and to receive carrier current of the other of said frequencies, said carrier terminal station comprising a normally deenergized carrier current transmitter for transmitting carrier current of a first one of said frequencies over said power line, carrier current receiving means tuned to receive carrier current of the second one of said frequencies incoming over said power line from any one of said carrier subscriber stations, means for modulating the carrier current transmitted over the power line with voice currents incoming over said telephone line, a relay controlling the energization of said transmitter, voice amplifier and detector means connected to said telephone line to operate said relay in response to voice currents incoming over said telephone line to said carrier terminal station, and means including a locking winding of said relay for maintaining the energization of said transmitter independent of said amplifier and detector means responsive to carrier current of said second frequency incoming to said carrier current receiving means over the power line from any one of said subscriber stations.

6. In a telephone system, a telephone line, a power transmission line, a carrier terminal station interconnecting said lines, and a plurality of telephone subscriber stations connected to said power line, each of said subscriber stations comprising carrier current transmitting and receiving means arranged to transmit carrier current of either one of two frequencies and to receive carrier current of the other of said frequencies, said carrier terminal station comprising a normally deenergized carrier current transmitter for transmitting carrier current of a first one of said frequencies over said power line, a carrier current receiver for receiving over said power line carrier current of the other of said frequencies, a hybrid coil having windings connected in series with said telephone line and windings connected to the input conductors of said carrier transmitter, means including said windings of the hybrid coil for modulating with voice current received over said telephone line the carrier current of said first frequency transmitted over said power line, amplifier and detector means connected to said hybrid coil in parallel with said carrier transmitter, means controlled by said amplifier and detector means for energizing said carrier transmitter in response to voice currents incoming over said telephone line, and means responsive to carrier current of said other frequency incoming to said carrier current receiver over said power line from any one of said carrier subscriber stations for maintaining the energization of said carrier transmitter independent of said amplifier and detector means.

JOHN M. BARSTOW.

REFERENCES CITED

The following references are of record in the file of this patent:

UNITED STATES PATENTS

| Number | Name | Date |
|---|---|---|
| 1,773,613 | Clark | Aug. 19, 1930 |
| 1,958,166 | Laurent | May 8, 1934 |
| 2,200,559 | Mitchell | May 14, 1940 |
| 2,289,048 | Sandalls, Jr. | July 7, 1942 |
| 2,301,223 | Mitchell | Nov. 10, 1942 |
| 2,388,001 | Loughren | Oct. 30, 1945 |
| 2,430,471 | Lang | Nov. 11, 1947 |